Jan. 24, 1961
M. T. HELLER
2,969,292
PERFORATED COOKING PACKAGE
Filed July 31, 1957
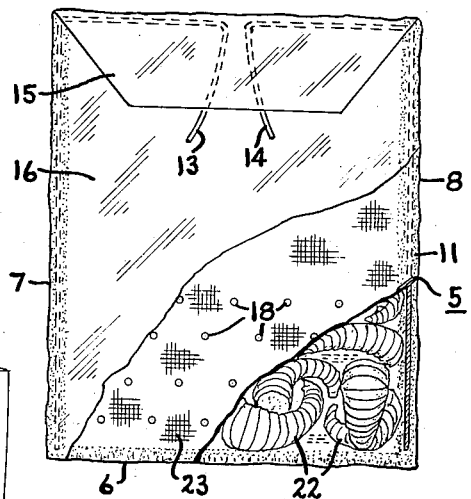
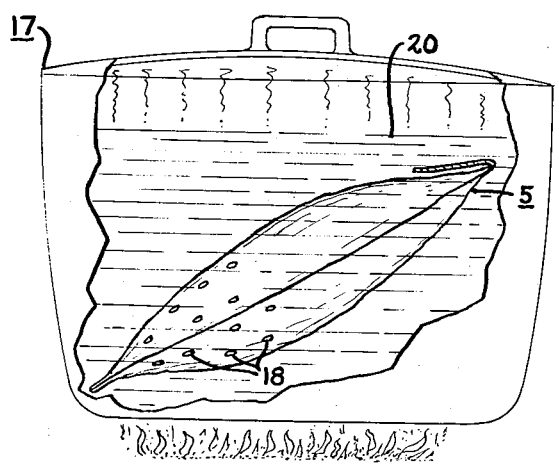
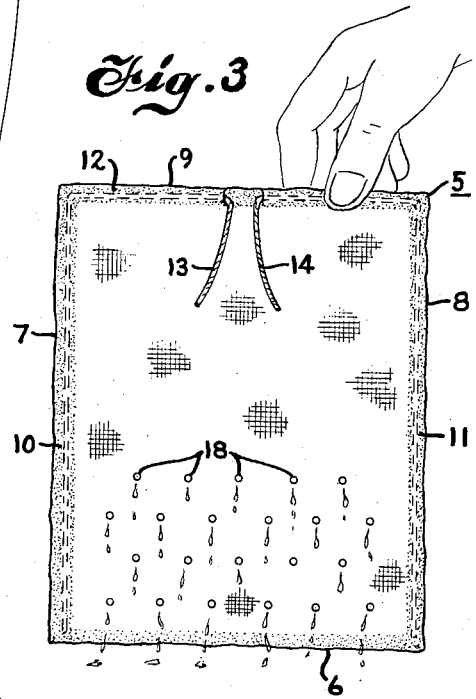
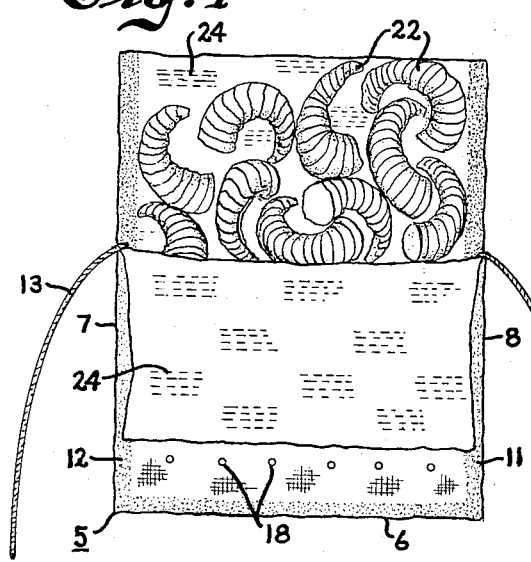
INVENTOR.
Melvin T. Heller
BY
Lieber & Lieber
ATTORNEYS.

United States Patent Office 2,969,292
Patented Jan. 24, 1961

2,969,292

PERFORATED COOKING PACKAGE

Melvin T. Heller, Whitefish Bay, Wis., assignor to Milprint, Inc., Milwaukee, Wis., a corporation of Delaware Filed July 31, 1957, Ser. No. 675,368

1 Claim. (Cl. 99—171)

This invention relates to a food container in which the food is merchandised and also cooked without unwrapping the food or otherwise preparing it beforehand. The container contemplated by this invention finds particular utility in cooking foods by submersion in hot cooking oils or fats where it is desired to have the cooking medium contact the food being cooked so as to impart a flavor thereto and heat the food by both conduction and convection.

There are numerous food containers being used today in which servings of food are sealed for merchandising and cooking in the container and without the necessity of first opening the package. Such a container is disclosed in the copending United States patent application Serial Number 588,278, filed May 31, 1956, now Patent No. 2,912,336 by Dominic A. Perino.

According to the present invention the food cooked in this novel container is brought into intimate contact with the hot cooking liquid thereby insuring that the food is evenly and thoroughly cooked throughout. Furthermore, the cooking oils or other solutions are able to impart any desirable flavor to the food. After the cooking process is completed the container may readily be lifted out of the cooking medium and the latter quickly drains from the container. The food is then ready to serve, the entire process being completed without removing the food from the container.

Another aspect of the invention is to provide a container of the above type in which the outer surface thereof is a dark color and the inner surface is a light or heat reflective color. With this particular arrangement the food is quickly and thoroughly heated by heat absorption through the bag because of the outer heat absorbing color and is also heating by intimate and penetrating contact with the hot cooking fluid. The light interior surface of the container completely diffuses the heat therein which has entered by either conduction or radiation as mentioned, and thereby insures complete and even heating of the food.

The invention further provides a sanitary covering for the packaged food which maintains the necessary sanitary requirements for the food during storage, merchandizing and prior to cooking.

These and other objects and advantages of the invention will appear hereinafter as this disclosure progresses, reference being had to the accompanying sheet of drawings in which:

Figure 1 shows a food cooking container made in accordance with the invention, and with the protective sanitary cover thereon and with a food product inside. The cover and container have been shown broken away for the sake of clarity.

Figure 2 is an elevational view of a cooking utensil, partially broken away to show the food container immersed in a cooking liquid.

Figure 3 is a view of the container after it has been cooked and showing the cooking liquid draining therefrom; and Figure 4 is a view showing the container partially opened.

Referring more particularly to the drawings, the food container 5 is formed from flexible metal foil which is heat conductive and capable of withstanding relatively high temperatures, and is generally of bag like or envelope shape. This metal foil container is formed, for example, from a single sheet of foil by folding the sheet in half thus forming the bottom edge 6. The remaining edges 7, 8 and the top 9 are formed by sealing the two halves together in the well known manner, thus forming, respectively, sealed portions or seams 10, 11, 12. Tear strings 13, 14 are disposed between the halves of the container and are located within the sealed portions 10, 11 and 12 thereof, having free ends extending from the seal 12.

As seen in Figure 1, the free ends of tear strings 13, 14 extend beyond the flap 15 of the protective bag 16. When it is desired to remove the food container from the bag 16, preparatory to cooking, it is necessary to simply grasp the free ends of the strings and pull, causing the flap 15 to unfold and the container 5 can then be withdrawn from the bag 16 and placed in the cooking vessel 17. The bag 16 is made from flexible and relatively inexpensive material which should also preferably be moisture proof, such as cellophane.

The heat conductive metal foil container 5 is capable of withstanding high temperatures and is relatively very thin which results in a flexible and lightweight package. A series of perforations 18 are provided in the container which permit the hot cooking fat 20, or other cooking liquid, to enter the container and surround the food pieces 22 to thereby thoroughly and evenly cook the same. As the cooking process takes place, the liquid is free to pass in and out of the container and circulate around the food.

To further promote the transfer of heat from the liquid to the food, the outer surface of the container may be coated with a dark ink or other surface coating 23 adapted to adhere to the foil. This dark coating will absorb heat from the liquid and transfer it evenly into the container by conduction through the highly heat conductive foil.

The inner surface of the container may be left uncoated or in other words, left the natural shiny finish of metal foil such as aluminum foil. This shiny surface 24 has been indicated by the sectioning for silver in Figure 4. Thereby the heat within the container is thoroughly diffused and radiated throughout the interior of the bag.

After the food has been cooked the container is lifted from the liquid, preferably by means of the tear strings as the container is hot at this time, and momentarily held by the strings above the liquid so as to permit the liquid to drain from the interior of the container through the holes 18. The perforated metallic container may then be readily opened in an obvious manner with the aid of the tear strings for access to the cooked commodity.

It will be appreciated that by means of this cooking container, a convenient and thorough job of cooking in hot liquids is readily accomplished with very little preparation and dirtying of utensils involved. It is unnecessary to individually handle each food piece and place them in the hot liquid or individually remove them therefrom.

Various modes of carrying out the invention are contemplated as being within the scope of the following claims particularly pointing out and distinctly claiming the subject matter which is regarded as the invention.

I claim:

A food package adapted to be cooked by submersion in hot cooking liquid, said package comprising, a pouchlike food container formed of flexible heat conductive and high temperature resistant metal foil and having front and rear walls provided with liquid entry and drainage openings near the container bottom and also having their top and opposite marginal side edges sealed, a food product to be cooked housed within said container, a pair of tear strings embodied in said top and opposite side sealed edges and adapted to open said container edges when pulled in opposite directions, and a flexible transparent wrapper bag for receiving and confining the food laden container to maintain the food in sanitary condition and having its mouth coextensive with the container top and provided with a closure flap depending externally over one of said container walls, said strings having adjacent free ends extending downwardly from the medial portion of the container top, and outwardly beyond said bag closure flap and being adapted when pulled apart to initially open said bag flap and to thereafter facilitate removal of the container from said bag through its open mouth without destroying the bag.

References Cited in the file of this patent

UNITED STATES PATENTS

| | | |
|---|---|---|
| Re. 22,490 | Rambold | May 30, 1944 |
| 1,370,858 | Tousey | Mar. 8, 1921 |
| 1,764,039 | Cooper | June 17, 1930 |
| 2,102,858 | Schlumbohm | Dec. 21, 1937 |
| 2,137,243 | Heyman | Nov. 22, 1938 |
| 2,711,346 | Irwin et al. | June 21, 1955 |
| 2,759,830 | Touceda | Aug. 21, 1956 |
| 2,805,162 | Kovel | Sept. 3, 1957 |
| 2,807,550 | Zarotschenzeff et al. | Sept. 24, 1957 |
| 2,912,336 | Perino | Nov. 10, 1959 |

FOREIGN PATENTS

| | | |
|---|---|---|
| 661,820 | Great Britain | Nov. 28, 1951 |
| 372,731 | Germany | Feb. 8, 1921 |

OTHER REFERENCES

Quick Frozen Foods, pp. 58 and 59, June 1956.

Food Engineering, page 22, May 1957, article entitled "Perforated Foil."